(12) United States Patent
Granger

(10) Patent No.: US 7,106,440 B2
(45) Date of Patent: Sep. 12, 2006

(54) REFRACTIVE-DIFFRACTIVE SPECTROMETER

(75) Inventor: Edward M. Granger, Rochester, NY (US)

(73) Assignee: Roygbiv, LLC, Richmond, CA (US)

( * ) Notice: Subject to any disclaimer, the term of this patent is extended or adjusted under 35 U.S.C. 154(b) by 0 days.

(21) Appl. No.: 11/083,895

(22) Filed: Mar. 17, 2005

(65) Prior Publication Data

US 2005/0219525 A1    Oct. 6, 2005

Related U.S. Application Data

(63) Continuation of application No. 10/723,342, filed on Nov. 25, 2003, now abandoned, which is a continuation of application No. 09/991,038, filed on Nov. 21, 2001, now Pat. No. 6,661,513.

(51) Int. Cl.
*G01J 3/28* (2006.01)

(52) U.S. Cl. .................................................. 356/326

(58) Field of Classification Search ........ 356/326–328, 356/331, 334
See application file for complete search history.

(56) References Cited

U.S. PATENT DOCUMENTS

| | | | |
|---|---|---|---|
| 3,900,263 A * | 8/1975 | Hall, Jr. ....................... 356/331 |
| 4,687,329 A | 8/1987 | Schultz | |
| 5,024,530 A | 6/1991 | Mende | |
| 5,424,826 A | 6/1995 | Kinney | |
| 5,424,827 A * | 6/1995 | Horwitz et al. ............. 356/328 |
| 5,652,681 A | 7/1997 | Chen et al. | |
| 5,781,290 A | 7/1998 | Bittner et al. | |
| 5,917,626 A | 6/1999 | Lee | |
| 5,973,838 A | 10/1999 | Shirasaki | |
| 5,991,482 A | 11/1999 | Laude | |

FOREIGN PATENT DOCUMENTS

JP    2000304614 A  *  2/2000

OTHER PUBLICATIONS

Notification of Transmittal of the International Search Reoprt or the Declaration, issued in corresponding PCT Appln. No. PCT/US02/37057, International Searching Authority, European Patent Office, dated Apr. 4, 2003, 5 pages.

* cited by examiner

*Primary Examiner*—Hoa Q. Pham
*Assistant Examiner*—Kara Geisel
(74) *Attorney, Agent, or Firm*—Parsons Hsue & de Runtz LLP

(57) ABSTRACT

A diffraction grating and a prism with the appropriate characteristics are employed to provide a combined dispersive characteristic that is substantially linear over the visible spectrum. Radiation from the grating and prism is collimated by a lens towards a detector array. The grating or a telecentric stop between the grating and prism is placed at a focal point of the lens in a telecentric arrangement so that equal magnification is achieved at the detector array. If the detector array is replaced by a plurality of optical channels, a multiplexer/demultiplexer is obtained.

3 Claims, 5 Drawing Sheets

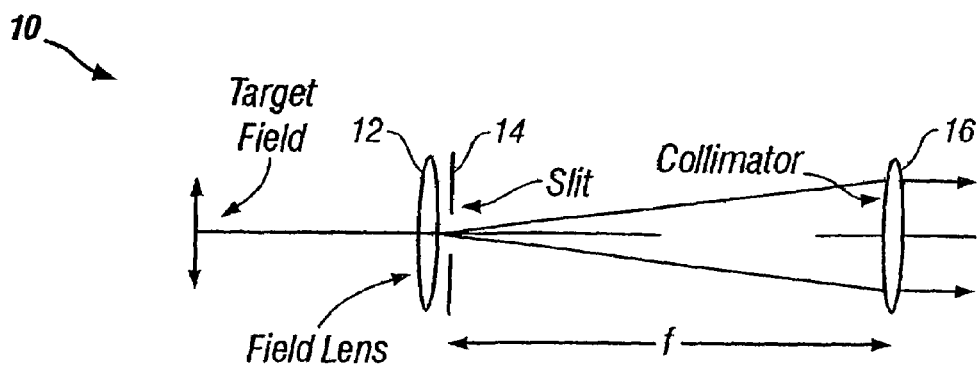
FIG. 2A
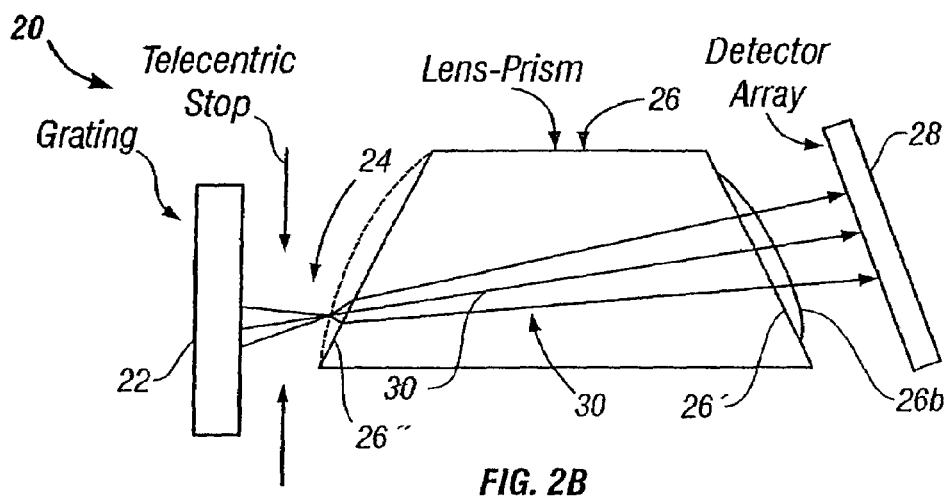
FIG. 2B
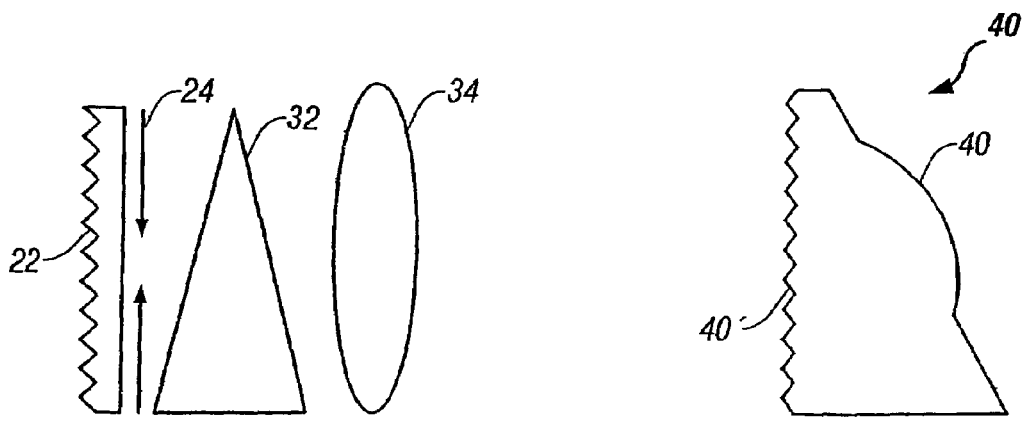
FIG. 3A   FIG. 3B

REFRACTIVE-DIFFRACTIVE SPECTROMETER

CROSS-REFERENCE TO RELATED APPLICATIONS

This application is a continuation of application Ser. No. 10/723,342, filed Nov. 25, 2003 now abandoned; which application is a continuation of application Ser. No. 09/991,038, filed Nov. 21, 2001, now issued as U.S. Pat. No. 6,661,513. These applications are incorporated herein in their entirety by this reference as if fully set forth herein.

BACKGROUND OF THE INVENTION

This invention relates in general to spectrometers and, in particular, a refractive-diffractive spectrometer.

Spectrometers or spectrophotometers are widely used devices. They are used in digital printers and printing presses. Hand-held spectrometers are used by graphic designers and imaging departments at newspapers, magazines, and copy shops.

In order to analyze the spectro data from images or objects, light from the images or objects is passed through optical elements to a detector, such as a charged coupled device ("CCD") array. In order to accurately measure the CIE tristimulus values of light sources, images or objects, it would be desirable to accurately resolve all of the wavelength components in the radiation from the light source. Spectrometers resolve such wavelength components by dispersing them at different angles depending on the wavelength. Unfortunately, up to the present time, spectrometers and spectrophotometers do not disperse the different wavelengths linearly. This means that after being dispersed by the spectrometer into the different wavelength components reaching the CCD array, the dispersion of a particular wavelength component is not proportional to the wavelength of the component. For example, if a prism is used in the spectrometer for dispersing the wavelength components of radiation from a source, the angle of refraction of any wavelength component is not proportional to its wavelength.

Radiation from many light sources can have a large number of spectral lines or wavelength components. Therefore, unless the CCD array has the same number of detectors as the number of wavelength components, at least some of the spectral lines or wavelength components of the light source will be directed to positions along the CCD array that does not fall entirely on any particular detector, but may fall partly on one detector and partly on another detector. Since the dispersion of the wavelength components is nonlinear, it cannot be assumed that a linear interpolation of the outputs of the two detectors will yield an accurate measurement of the intensities of such wavelength components. This causes error in measurement. Therefore, to accurately measure the CIE tristimulus values of light sources of filters that have fine spectral detail, spectrometers of the conventional design require higher spectral resolution. However, high quality spectrometers are expensive.

It is therefore desirable to provide improved spectrometers and spectrophotometers in which the above-described disadvantages are avoided.

SUMMARY OF THE INVENTION

This invention is based on the recognition that, by employing two optical elements having a combined dispersive characteristic such that they substantially linearly disperse electromagnetic radiation over at least a portion of an electromagnetic spectrum, the above-described disadvantages of conventional spectrometers and spectrophotometers can be avoided. In the preferred embodiment, a refractive element such as a prism and a diffraction grating may be employed. Preferably, the two optical elements are arranged so that the spectrometer is substantially telecentric; in such event, the spectrometer provides substantially the same magnification at different wavelengths in the spectrum. In other words, radiation energy will be dispersed also linearly across the portion of the electromagnetic spectrum.

Where the combined dispersive characteristic of the two elements is substantially linear, linear interpolation of the type described above would not introduce significant interpolation errors, in contrast to the conventional design of spectrometers. Therefore, even if high resolution CCD arrays are not used, radiation sources, images and objects having a rich spectrum can still be accurately measured. This drastically reduces the cost of the spectrometer.

Instead of actually detecting the different wavelength components, the wavelength components may be directed towards different optical channels in a demultiplexing arrangement. First, the light or radiation source may be an input optical channel carrying radiation of different wavelength components. After passing such wavelength components through the two optical elements, the wavelength components are dispersed substantially linearly. Therefore, irrespective of the wavelengths of the wavelength components in the input optical channel, one can be certain that a particular output channel is carrying a corresponding particular wavelength component. This is not possible if the combined dispersive characteristics of the two optical elements are not substantially linear. The above demultiplexing arrangement is bidirectional. In other words, the separate output channels in the above demultiplexing arrangement can instead become input channels. The wavelength components in such separate input channels, after passing through the two elements, will emerge as a combined beam towards the output channel (the input channel in the demultiplexing arrangement) in a multiplexer arrangement. Again, since the combined dispersive characteristic of the two elements is substantially linear, the different wavelength components will be combined into a single beam by the two elements irrespective of the wavelengths of the different input wavelength components.

BRIEF DESCRIPTION OF THE DRAWINGS

FIG. 2A is a schematic view of the influx optics portion of a spectrometer to illustrate a preferred embodiment of the invention.

FIG. 2B is a schematic view of the spectrometer section of the embodiment of FIG. 3A.

FIG. 3A is a schematic view of a diffraction grating, a prism and a lens to illustrate one combination of optical elements in the spectrometer to illustrate the invention.

FIG. 3B is a schematic view of a combined grating-prism-lens structure in an embodiment to illustrate still another embodiment of the invention.

For simplicity in description, identical components are labeled by the same numerals in this application.

DETAILED DESCRIPTION OF THE EMBODIMENTS

Figure 1A:
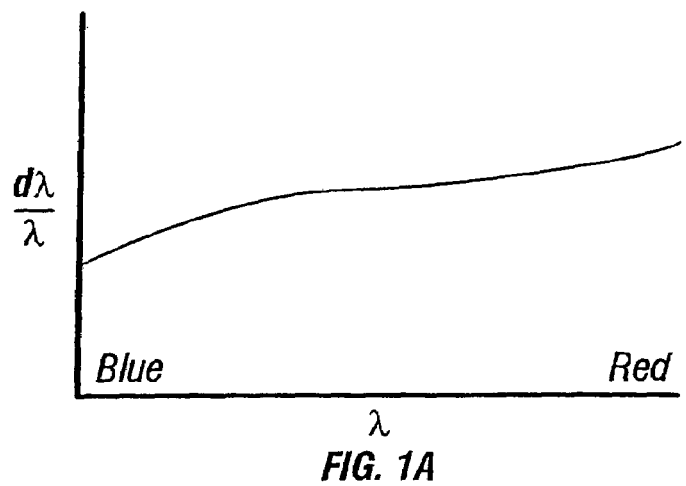
FIG. 1A is a graphical plot of the natural spectral dispersion of a diffraction grating useful for illustrating the invention.
Figure 1B:
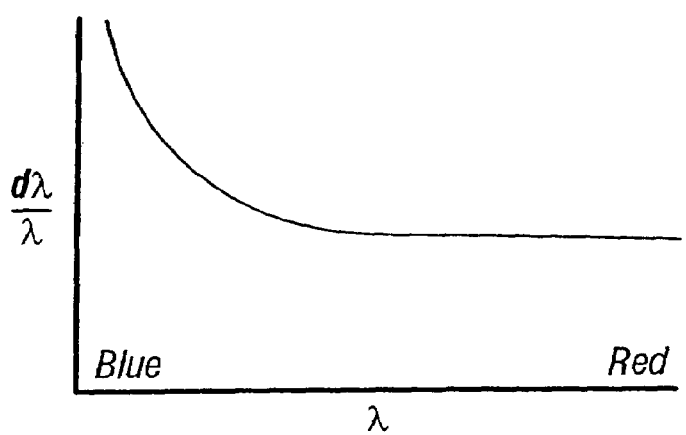
FIG. 1B is a graphical plot of the natural dispersion of an optical prism useful for illustrating the invention.
Figure 1C:
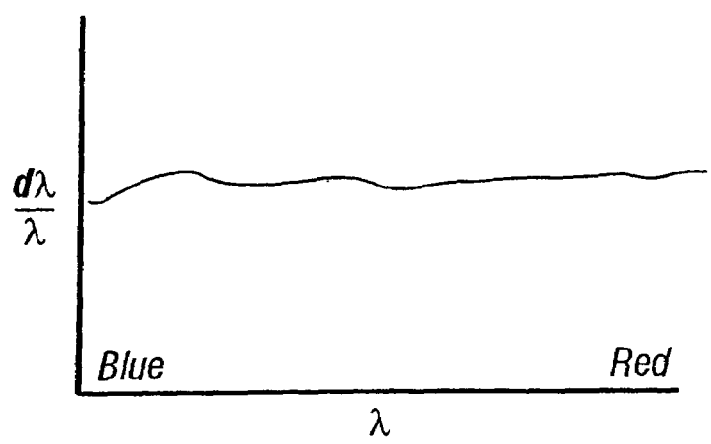
FIG. 1C is a graphical plot of the dispersion of the combination of a diffraction grating and a prism.

FIG. 1A is a graphical plot of the natural spectral dispersion of a divergent light diffraction grating. As shown in FIG. 1A, a diffraction grating has higher dispersion of longer wavelength components compared to the shorter wavelength components in the visible spectrum. Thus, as shown in FIG. 1A, wavelength components at or near the red end of the spectrum are dispersed by a greater amount compared to wavelength components towards the blue end of the spectrum. FIG. 1B is a graphical plot illustrating the natural dispersion of optical prisms. As shown in FIG. 1B, the dispersion of prisms has the opposite characteristic compared to gratings. Prisms disperse wavelength components at or near the blue end of the visible spectrum by a greater amount compared to other wavelength components. Therefore, by employing both a grating and a prism, the combined dispersive characteristic can be made to be uniform over the entire visible spectrum, as illustrated in FIG. 1C.

The spectrometer of this invention is based on using refraction and a transmissive (or reflective) diffraction grating to produce an efficient and compact spectrometer. The design goal is a linear wavelength dispersion and constant spectral bandwidth. The goals are achieved by using a transmission grating in conjunction with a new form of a lens-prism. A grating, which has high dispersion in the red region of the spectrum, is combined with a lens-prism that has high dispersion in blue spectral region results to produce constant spectral dispersion as shown in FIG. 1C in the same manner just as one would do to achromatize a multi-element lens. The slit magnification is maintained by use of a telecentric stop in the lens-prism. The stop is placed at or near the diffraction grating. The telecentric system maintains a constant F/# across the spectrum and therefore constant slit magnification. The telecentric system has the additional advantage that the detector array is illuminated normal to the array. This configuration minimizes cross talk between array elements. Alternatively, while the rays 30 may remain substantially normal to the detector array, to avoid back-reflection, it may be desirable to slightly tilt the rays or the array so that the rays are at small angles to the normal direction to the array.

With this brief description, the system and the design will be explained in subgroups:

Influx Optics

The influx optics 10 comprises a field lens 12, a slit 14 and a collimator 16 as shown below in FIG. 2A. The field lens is placed just in front of the slit (slit can also be integrated with the lens) to collect light from the target 18 and the slit is placed substantially at a focal point of collimating lens 16. The function of the field lens is to image the collimating lens to the sample area or target 18. With this configuration, all of the light from the sample area 18 that passes through the spectrometer entrance slit also passes through the collimating lens. This minimizes scattered light after the slit since all light leaving the slit will be directed toward the collimating lens.

The width of slit 14 defines the spectral resolution of the system. The slit height is chosen to fill the height of the elements of the detector array in the spectrometer section 20 of FIG. 2B. For a given spectral resolution, the slit width is the product of the focal length of the collimator and angular resolution of the grating of FIG. 2B. Once the spectral resolution and the target area are chosen the collimator dimensions are also defined. In one embodiment, a large slit and a long F/10.0 collimator are used. This makes both the slit and the lens easy to manufacture.

The collimating lens and the following stops define the field of view of the instrument at the target plane. The entrance slit 14 is placed substantially at a focal point of collimating lens 16 so that the collimating lens images the entrance slit to infinity so that the light falling on the grating is collimated (all light rays from a point are parallel). The grating could be illuminated with diverge light. Unfortunately, divergent light passing through the gating produces comatic aberration. The extra aberration would increase the bandwidth of the instrument as a function of wavelength.

The Spectrometer

The spectrometer section 20 has four parts: a grating 22, a telecentric stop 24, a lens-prism 26 and detector array 28, such as a CCD array. These elements are shown in FIG. 2B. The collimated light from the front section 10 passes through and diffracted, or is reflected and diffracted, by the grating and is dispersed into its spectral components as shown in FIG. 2B. These rays are further dispersed by the first surface of the lens-prism element. In one embodiment, the grating is ruled at 600 lines/mm. The grating frequency and the prism angle are part of the design optimization. The lens-prism comprises a prism portion 26a and a lens portion 26b. The last variable in the optimization is the choice of which wavelength will strike normal to the second face 26' of the prism portion. It is this ray (the center ray 30' in FIG. 2) that is the optical axis of lens portion 26b that makes up the second face of the lens-prism. The grating frequency, prism angle and wavelength of the chief ray (optical axis) are chosen to produce a system with linear spectral dispersion. Any one of the commonly used optical component design programs may be used to provide a precise optical design for a system with linear spectral dispersion given the above inputs (grating frequency etc.) so that it is not necessary to describe the process in detail.

In one embodiment, the grating frequency is targeted to be in the range of 500 to 600 lines/mm. The frequency is kept low to minimize polarization efficiency differences. At higher frequencies polarization scramblers would be required to compensate for these polarization differences. The grating is blazed for the first order. The blaze angle is determined by the spectral sensitivity of the system. The wavelength of the maximum efficiency is placed where the system has the least sensitivity. In general the optimum solution is to have the same signal strength from each portion of the spectrum when reading a perfect white reference.

The lens-prism 26 is designed so that the first or higher order diffracted light is collimated and transmitted by the grating 22 and focused on the detector array 28. The length of the prism is determined by the focal length of the final lens surface of lens portion 26b. The face 26" of the prism portion next to the grating is approximately at the infinity focus of the Lens-Prism. As shown in FIG. 2B, rays 30 of light leaving a point near the grating leave the final lens in a collimated state (parallel). This is the telecentric condition. To achieve such condition, the telecentric stop 24 is located at or substantially at a focal point of the lens portion 26b. If no stop 24 is employed, the grating 22 is located at or substantially at a focal point of the lens portion 26b. This enables substantially equal magnification of all wavelength components in all the rays 30. Surface 26" may be aspheric as shown in dotted line in FIG. 2B to compensate for geometric aberration introduced by the collimating lens 16 of FIG. 2A.

The detector array 28 is positioned to be in focus at each wavelength and substantially perpendicular to the telecentric rays leaving the final lens surface of lens portion 26b. This position of the array 28 minimizes cross talk between elements and assures constant slit magnification and therefore constant spectral bandwidth at every detector site in the array.

While in the preferred embodiment, a lens-prism 26 is employed, it is also possible to use a separate prism and a separate lens instead, as illustrated in FIG. 3A. In such event, the telecentric stop 24 is placed at a focal point of lens 34. Where no stop 24 is used, grating 22 is placed at a focal point of lens 34. In the same manner as illustrated above in reference to FIG. 2A, 2B, grating 22 of FIG. 3A may act as a transmissive or reflective grating. In other words, light (preferably collimated) from the target may pass through and diffracted by grating 22 and proceed towards prism 32 and lens 34, or is reflected and diffracted by the grating. In any event, the first or higher order diffraction passes through prism 32 and lens 34 and is incident on a detector array such as array 28 (not shown). In still another arrangement, all three elements: the grating, the prism and the lens may be combined into a single optical element 40 as shown in FIG. 3B. In such event, the grating surface 40' is located substantially at a focal point of the lens portion 40" of the element.

Figure 4:
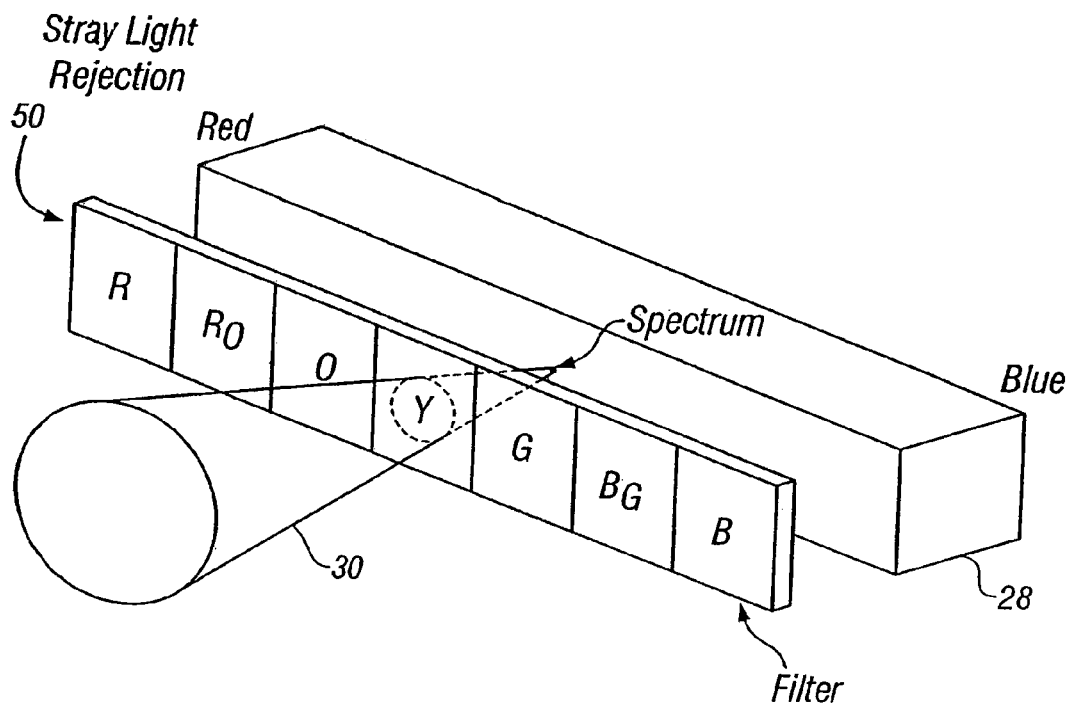
FIG. 4 is a schematic view of a filter portion of the spectrometer to illustrate another aspect of the invention.

FIG. 4 is a schematic view illustrating a filter placed in front of the detector array 28 to further reduce cross-talk in the spectrometer of this invention. As shown in FIG. 4, the rays (such as rays 30 of FIG. 2B) that are directed towards the detector array are first passed through corresponding filter elements 50 before the filtered rays are then directed towards the detector array 28. While only seven filters 50 are shown in FIG. 4, comprising blue, blue-green, green, yellow, orange, red-orange and red filters, it will be understood that more or fewer filters may be employed, which is within the scope of the invention.

Explained below is the reason why the new Grating-Prism-Lens (GPL) Spectrometer of this invention has the colorimetric accuracy of a spectrometer with a much smaller bandwidth. A 1 nm bandwidth conventional system is compared to a 10 nm GPL system.

The GPL spectrometer (such as system 20 of FIG. 2B) has been designed to have two unique features. The first is that by using a prism combined with a grating, the dispersion of the system is made linear or substantially linear over the visual wavelength region of 400 nm to 700 nm. By using a prism combined with a grating, the dispersion of the system can also be made linear or substantially linear over a portion of the spectrum that includes wavelengths in the infrared or ultraviolet range. Thus, the spacing between 10 nm samples occurs at equal distances in the image plane. Second, the use of the telecentric condition produces a system that has constant magnification of the slit for all wavelengths. Therefore, an array detector with 10 nm spacing between detectors will be just filled with light by a line source that is at the center wavelength of the detector.

Figure 5A:
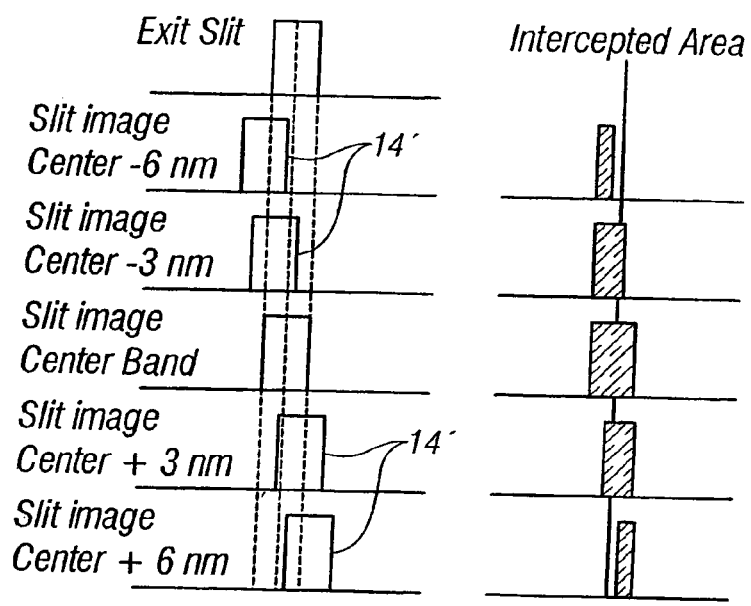
FIG. 5A is a schematic view illustrating the relative positions of the entrance slit image and of the exit slit or detector to illustrate conceptually the operation of the invention.
Figure 5B:
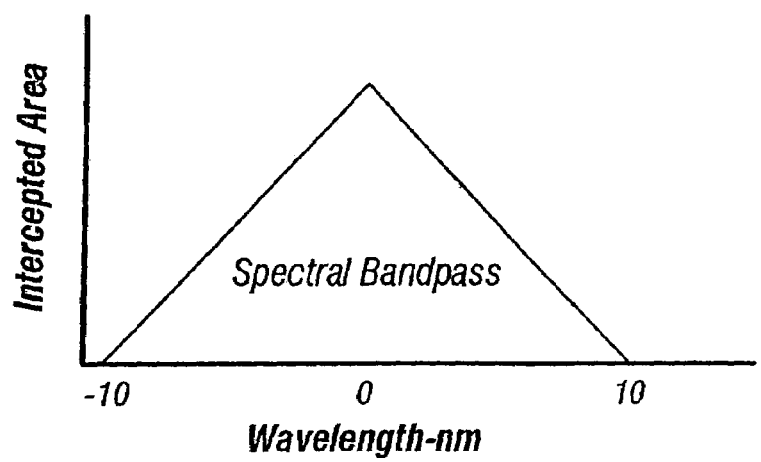
FIG. 5B is a graphical plot of the intercepted area of FIG. 5A versus wavelength to illustrate the operation of the invention.

FIG. 5A illustrates how the image of the entrance slits, from wavelengths differing from the center wavelength of the detector element, move across the array element. The detector element acts as the exit slit of the system. FIG. 5A shows how much of the light is inter epted for each of the line spectra. The images 14' of the slit 14 of FIG. 2B on the exit slit (detector) are shown for wavelength differences of −6 nm, −3 mn, 0.0 nm, 3 nm and 6 nm. The amount of energy intercepted by the exit slit is directly proportional to the difference between the center wavelength of the exit slit position and the wavelength of the entering light. Therefore, if the wavelength difference is zero, all the light from the entrance slit will fall on the exit slit. As is shown in the plot on FIG. 5B, the amount of light intercepted by the exit slit is a linear function of the difference between wavelengths. The amount of light intercepted by the exit slit is zero for differences of 10 nm or greater. The amount of light falling on a detector is a triangular function of the difference in wavelength between the center wavelength and the wavelength of the entering light.

The GPL is different from other spectrometer configurations. All others have some form of uncorrected dispersion. As such, none of them exhibit the natural interpolation abilities of the GPL spectrometer. All other spectrometers require higher spectral resolution to accurately measure the CIE tristimulus values of source or filters that have fine spectral detail. The GPL spectrometer can determine the CIE tristimulus values of line spectra without the need to resolve the line spectra. The next section illustrates the ability of the GPL system.

GPL CIE Tristimulus Determination

Spectrometers in use today require a resolution of 1 nm to determine the tristimulus values of sources that have line spectra included in a continuum spectrum. Fluorescent lamps and monitor phosphors are good examples of problem sources that normally require high spectral resolution. The GPL spectrometer has the ability of obtaining accurate CIE tristimulus values without the need to resolve the spectral lines. Since all radiation is just the sum of an infinite number of spectral line sources, the GPL will yield accurate tristimulus values for all light distributions. The following discourse will illustrate the ability of the GPL system to produce exact CIE tristimulus values for an infinitesimal width spectral line source.

Figure 6:
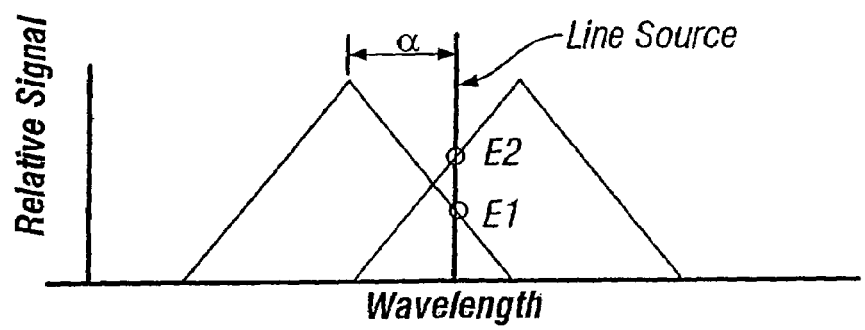
FIG. 6 is a graphical plot of the relative signal obtained by interpolation to illustrate an aspect of the invention.

FIG. 6 shows the spectral response functions of two adjacent detectors in an array of detectors. An arbitrary and perfect line source is received by the GPL system that has a wavelength that is between these detectors. The source wavelength is assumed to be placed at a distance α times the spectral distance between the adjacent detectors.

A perfect spectrometer with a small enough bandwidth is assumed to resolve the source given above. One would then know the exact center wavelength of the source and the energy of the source, Es. The tristimulus value of the source would be computed by linear interpolation. The known source wavelength lies between two wavelengths where the CIE color mixing functions have been tabulated. The tristimulus value is given by linear interpolation:

$$T = M1*Es*(1-\alpha) + M2*Es*\alpha \quad (1)$$

where M1 is the color mixing function at the lower wavelength and M2 at the upper wavelength. The source wavelength lays a proportionate distance a from the lower wavelength.

FIG. 6 shows how the source is seen by the GPL spectrometer. The original energy passing through the entrance slit falls on both detectors. Detector 1 receives E1 amount of energy and detector 2 receives E2. The tristimulus value would be calculated as follows:

$$T = W1*E1 + W2*E2 \quad (2)$$

From FIG. 6, one can see that the triangular band pass of GPL devise splits the energy, Es, as follows:

$$E1 = Es*(1-\alpha) \quad (3)$$

and $$E2 = Es*\alpha \quad (4)$$

Now if equations 3 and 4 are substituted for E1 and E2 in equation 2, we obtain:

$$T = W1*Es*(1-\alpha) + W2*Es*\alpha \quad (5)$$

This is the same result obtained by the spectrometer with infinite resolution. Therefore, if the use of the spectrometer is to determine the tristimulus values of a source, the GPL spectrometer will give the proper result. If the purpose is to accurately resolve the spectral components of the source, then the broad band GPL is not the appropriate tool.

Bandwidth Considerations

Figure 7:
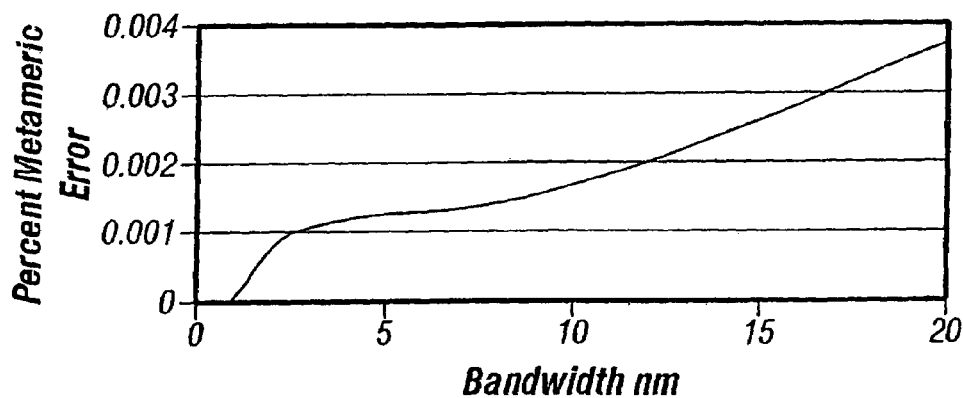
FIG. 7 is a graphical plot of the percent metameric error versus bandwidth to illustrate the invention.

The final question in the design of the GPL device is the wavelength spacing of the samples. The choice was made to use 10 nm spacing. This choice is a compromise between accuracy and sensitivity. The sensitivity of the instrument increases with increase of bandwidth. Unfortunately the metamerism error in the computation of tristimulus values increases with spectral bandwidth. Triangular filtering a 1 nm table of color mixing functions to a 3, 10 and 20 nm bandwidth simulated the optical actions of each spectrometer. The metameric error is calculated by subtracting the linear interpolated data from the true 1 nm color mixing functions. FIG. 7 displays the increase of standard deviation of metameric error as a function of spectral bandwidth. A spectral resolution of 10 nm is chosen as optimum compromise between sensitivity and metameric error. Note that the error difference between a 3 nm and a 10 nm bandwidth is small as compared with an instrument with a 20 nm bandwidth.

The GPL spectrometer has been designed to have linear dispersion and constant slit magnification over the spectral region of 400 to 700 nm. As a result the instrument can measure the CIE Tristimulus values of sources that contain very spiky spectral components. An analysis is made of the metameric error in the weighting functions as a result of using the triangular spectral band pass as an interpolator. It is found that 10 nm was the upper limit of the allowed spectral band pass to limit metameric error to a value of 0.001639 RMS of the true value of the color mixing functions. This value is only slightly larger that a system with a 3 nm bandwidth.

Multiplexer/Demultiplexer

Figure 8:
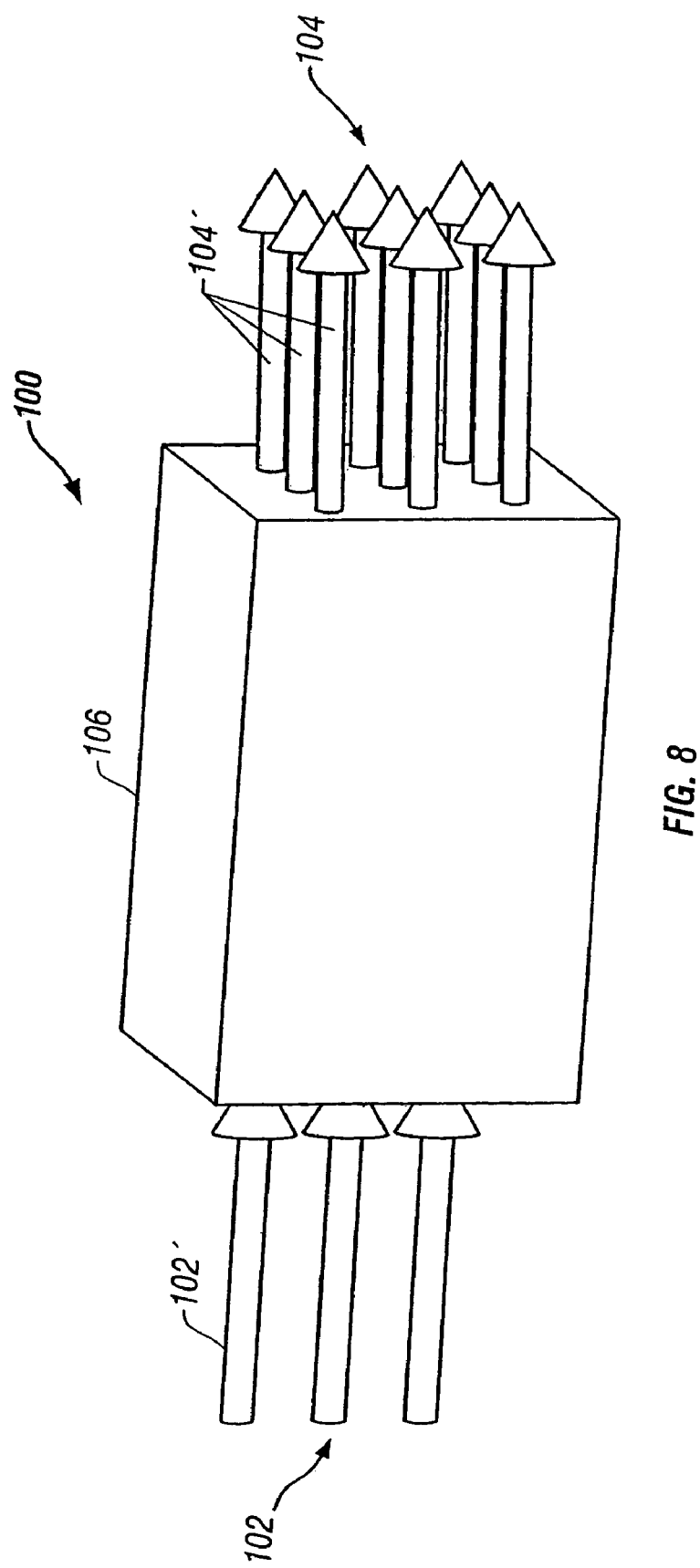
FIG. 8 is a schematic view of a demultiplexer/multiplexer to illustrate another aspect of the invention.

The above-described diffraction grating and prism may also be used in optical multiplexers and demultiplexers as illustrated in FIG. 8. Thus, in reference to FIGS. 2A and 2B, if the radiation or light collected by field lens 12 originates from an optical channel such as an optical fiber, such radiation is collected by lens 12 in the same manner as that described above. Radiation from collimator 16 then undergoes diffraction and other optical operations in FIG. 2B, except that instead of being detected by a detector array 28, each of the rays 30 is collected by a corresponding output optical channel. In other words, the different wavelength components from an input optical channel is dispersed into its different wavelength components where each wavelength component is then collected by a corresponding output optical channel, thereby functioning as an optical demultiplexer.

Thus, as shown in FIG. 8, each of the three arrows 102 is an input optical channel. For each input optical channel 102, there is a corresponding optical system comprising lens 12, slit 14, collimator 16, grating 22, stop 24, lens-prism 26 and the separated wavelength components are collected by a plurality of three output optical channels. While only three output optical channels 104 are shown collecting the wavelength components originating from each input optical channel 102, fewer or more output optical channels may be employed and is within the scope of the invention. Thus, output optical channels 104' are used to collect rays 30 that originate from input optical channel 102', and direct these optical signals to corresponding receivers (not shown). The same advantages of linear dispersion and equal magnification can advantageously be used in the demultiplexer 100. Since the dispersion is linear, it would be easy to identify the spacing and location of the output optical channels 104, if the expected wavelengths of the input radiation is known. It would then be much simpler to design the demultiplexer 100. Since system 100 provides substantially the same magnification for all wavelength components, there would be little or no distortion or unequal reduction of intensity of the wavelength components between the different wavelength components in the different output channels.

As shown in FIG. 8, where the input and output optical channels are optical fibers, a GRIN lens (not shown) may be used as an optical interface for each of the optical channels in FIG. 8.

The passage of radiation in system 100 is bidirectional. This means that system 100 may also function as a multiplexer by converting each of the input optical channels 102 into output optical channels and the output optical channels 104 into input optical channels. In such event, the different wavelength components carried by the input optical channels 104' would then be combined and directed towards the output optical channel 102' in such multiplexer. Again, if the optical channels are optical fibers, GRIN lenses may be employed as optical interfaces.

While the invention has been described above by reference to various embodiments, it will be understood that changes and modifications may be made without departing from the scope of the invention, which is to be defined only by the appended claims and their equivalent. For example, while it is preferred to employ a refractive element and a grating so that their combined dispersion is substantially linear, it may be adequate for some applications where the combined dispersion over at least a portion of an electromagnetic spectrum is not linear, but nevertheless more even than by only one of the two elements. All references referred to herein are incorporated by reference in their entireties.

The invention claimed is:

1. A method for determining optical characteristics of radiation, comprising:

passing the radiation to an apparatus comprising at least a first and a second element that disperse electromagnetic radiation according to wavelength, said at least two elements having a combined dispersive characteristic such that they substantially linearly disperse the electromagnetic radiation over at least a portion of an electromagnetic spectrum, wherein said at least two elements are arranged so that the apparatus is substantially telecentric;

detecting wavelength components of the radiation dispersed by the apparatus; and linearly interpolating the detected wavelength components to obtain interpolated wavelength components of the radiation.

2. The method of claim 1, wherein at least one optical value that characterizes the radiation is obtained in the linear interpolation.

3. The method of claim 1, wherein information concerning a tristimulus value of the radiation is obtained by said linear interpolation.

* * * * *